United States Patent [19]

Peters et al.

[11] 4,124,379
[45] Nov. 7, 1978

[54] RECOVERY OF SILVER FROM CUPROUS CHLORIDE SOLUTIONS BY AMALGAMATION

[75] Inventors: Mark A. Peters; William G. Kazel, both of Arvada, Colo.

[73] Assignee: Cyprus Metallurgical Processes Corporation, Los Angeles, Calif.

[21] Appl. No.: 760,082

[22] Filed: Jan. 17, 1977

[51] Int. Cl.² ............................................. C22B 11/00
[52] U.S. Cl. ..................................... 75/118 R; 75/109
[58] Field of Search ..................... 75/109, 117, 118, 83

[56] References Cited

U.S. PATENT DOCUMENTS

| | | | |
|---|---|---|---|
| 1,429,131 | 9/1922 | Field | 75/109 |
| 3,972,711 | 8/1976 | Goens et al. | 75/117 |

Primary Examiner—M. J. Andrews
Attorney, Agent, or Firm—Sheridan, Ross, Fields & McIntosh

[57] ABSTRACT

A process for recovering silver from chloride solutions comprising contacting the solution with amalgams of various metals from Groups 2b, 4a, 5a, or 8b of the periodic table or copper to replace the metal with silver and recovering silver from the formed silver amalgam. The process provides an improvement in the process for recovering copper from its ores in which the copper in the ore is solubilized as cuprous copper in a leach liquor and the copper recovered from the leach liquor as cuprous chloride by crystallization, the improvement being the removal of silver from the leach liquor prior to crystallization by use of the amalgam to produce substantially silver-free cuprous chloride crystals.

21 Claims, 2 Drawing Figures

FLOWSHEET OF Ag RECOVERY BY AMALGAMATION

RECOVERY OF SILVER FROM CUPROUS CHLORIDE SOLUTIONS BY AMALGAMATION

BACKGROUND OF THE INVENTION

1. Field of the Invention

The invention lies in the field of recovering silver from cuprous chloride by amalgamation techniques.

2. Description of the Prior Art

In the recovery of copper from its ores, particularly sulfide ores, it is well known, as disclosed in U.S. Pat. Nos. 3,785,944 and 3,972,711, in order to avoid the disadvantages of recovering copper electrolytically, pyrometallurgically, and by other methods, to solubilize the copper in the ore as cuprous chloride in a leach followed by cooling the slurry to crystallize the cuprous chloride and recover copper from the cuprous chloride crystals. A major disadvantage of wet recovery like this technique, is that impurities like silver, iron and others are carried over during the crystallization into the cuprous chloride crystals and end up as impurities in the final copper product. Some of these impurities are deleterious to the properties of copper and reduce its sale value. While the latter may not be necessarily true of silver, the failure to recover the high priced silver so that it is not sold along with the copper at the price of copper, detracts from the economic feasibility of the overall process.

In accordance with prior art, silver is removed from high chloride solution by cementation on copper metal. It was found that the presence of cuprous copper in the solution however renders this technique inoperative. For example, it was found that silver was efficiently removed by cementation with copper metal down to <0.001 g/l Ag from 200 g/l NACl or 182 g/l $Fe^{++}$ from solutions containing no $Cu^+$. Also that the presence of 11, 23, or 30 g/l $Cu^+$ in these solutions only permitted the Ag concentration to be lowered to 0.009, 0.016, and 0.026 g/l Ag, respectively. These data illustrate the deleterious effect of $Cu^+$ and therefore demonstrate the need for a reductant which can cement Ag but not cement $Cu^+$ from the solution.

Accordingly, it is an object of this invention to provide an effective process for recovering silver from cuprous chloride and additionally produce a silver and iron-free cuprous chloride.

It is another object of this invention to provide an improvement in the process for recovering copper from its ores in which the copper is solubilized as cuprous chloride, the cuprous chloride crystallized and the copper produced from the cuprous chloride crystals, the improvement being a procedure for recovering silver from the cuprous chloride crystals before copper is produced from them.

SUMMARY OF THE INVENTION

A process for recovering silver from solutions comprising contacting the solution with amalgams of various metals from groups 2b, 4a, 5a, or 8b of the periodic table or copper to replace the metal in the amalgam with silver and recovering silver from the formed silver amalgam. Silver is eventually recovered from the amalgam by distillation. A variety of techniques may be employed to pre-concentrate the silver before distillation. The invention includes the use of various sources of chloride ion, such as sodium chloride or ferrous chloride to keep the silver chloride and cuprous chloride in solution. An application of the invention is as an improvement in the process for recovering copper from its ores in which the copper in the ore is solubilized as cuprous copper in a leach and the copper recovered from the leach liquor as cuprous chloride by crystallization, the improvement being the removal of silver from the leach liquor prior to crystallization by use of the amalgam to produce substantially silver-free cuprous chloride crystals.

DESCRIPTION OF THE PREFERRED EMBODIMENT

The invention has application in processes for recovering copper from its ores containing iron and silver as impurities and in which process the copper sulfide ore is leached with ferric chloride and the soluble cupric chloride reduced to the cuprous form, followed by recovering cuprous chloride from the leach liquor by crystallization and recovery of copper from the crystallized cuprous chloride. It is difficult in this process to prevent silver from being carried over into the cuprous chloride crystals from which product copper is recovered by reduction with hydrogen.

Figure 2:
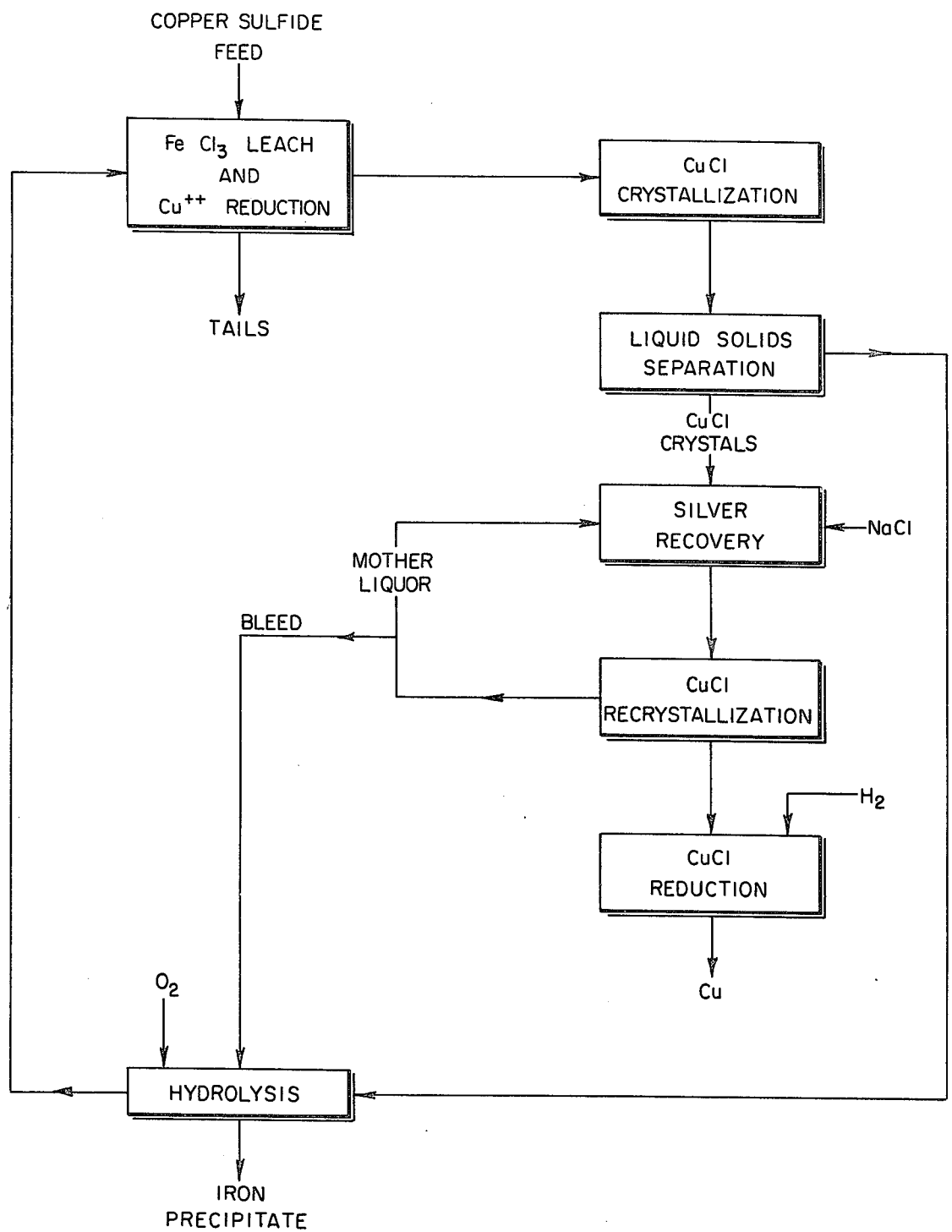
FIG. 2 is a schematic flow diagram illustrating where the silver recovery process would be introduced into the flowsheet of a prior art process for the recovery of copper from its sulfides described in U.S. Pat. No. 3,972,711.

The invention can be adapted to the above process for the recovery of silver either as shown in FIG. 2, or after the cuprous chloride crystallization from sodium chloride solution, or earlier in the flowsheet after the initial leach. Whichever option is used, any cupric ions in the cuprous chloride solution must be reduced by copper metal to the cuprous state. The reduced cuprous chloride solution is then contacted with an amalgam to replace the metal in the amalgam with silver thus removing silver from the solution. Obviously, the preferred metal for replacing silver is copper because the use of copper does not introduce any additional impurities which could co-precipitate with cuprous chloride.

After the amalgamation step, the mother liquor is cooled to produce cuprous chloride crystals which are substantially free of silver and iron. Copper is then recovered from the cuprous chloride crystals, preferrably by reduction with hydrogen.

The invention is not restricted in its application to processes for recovering copper from its ore, but applies broadly to the recovery of silver from silver chloride solutions and from solutions containing both silver chloride and cuprous chloride, irrespective of the origins of these solutions.

It was found that very little silver can be cemented with the amalgam in the presence of cupric ions. It was also found that the invention is much more efficient in the absence of cupric and other ions which have a more oxidizing emf than silver. Accordingly, in the preferred modification, a reduction step is performed on the cuprous chloride solution or leach liquor prior to amalgamation to reduce any cupric and ferric ions present.

Although the description of the invention and the flowsheet illustrating it are based on the application of the invention to a process for recovering copper from its ores, the invention is not limited to this application as it includes the recovery of silver from solution broadly.

Furthermore, even though the process is described and illustrated in the flowsheet as starting with cuprous chloride crystals produced in a process for recovering copper from its ores in which the copper is recovered as cuprous chloride crystals, it is not limited to this modification as the feed material can be a solution containing cuprous chloride.

Figure 1:
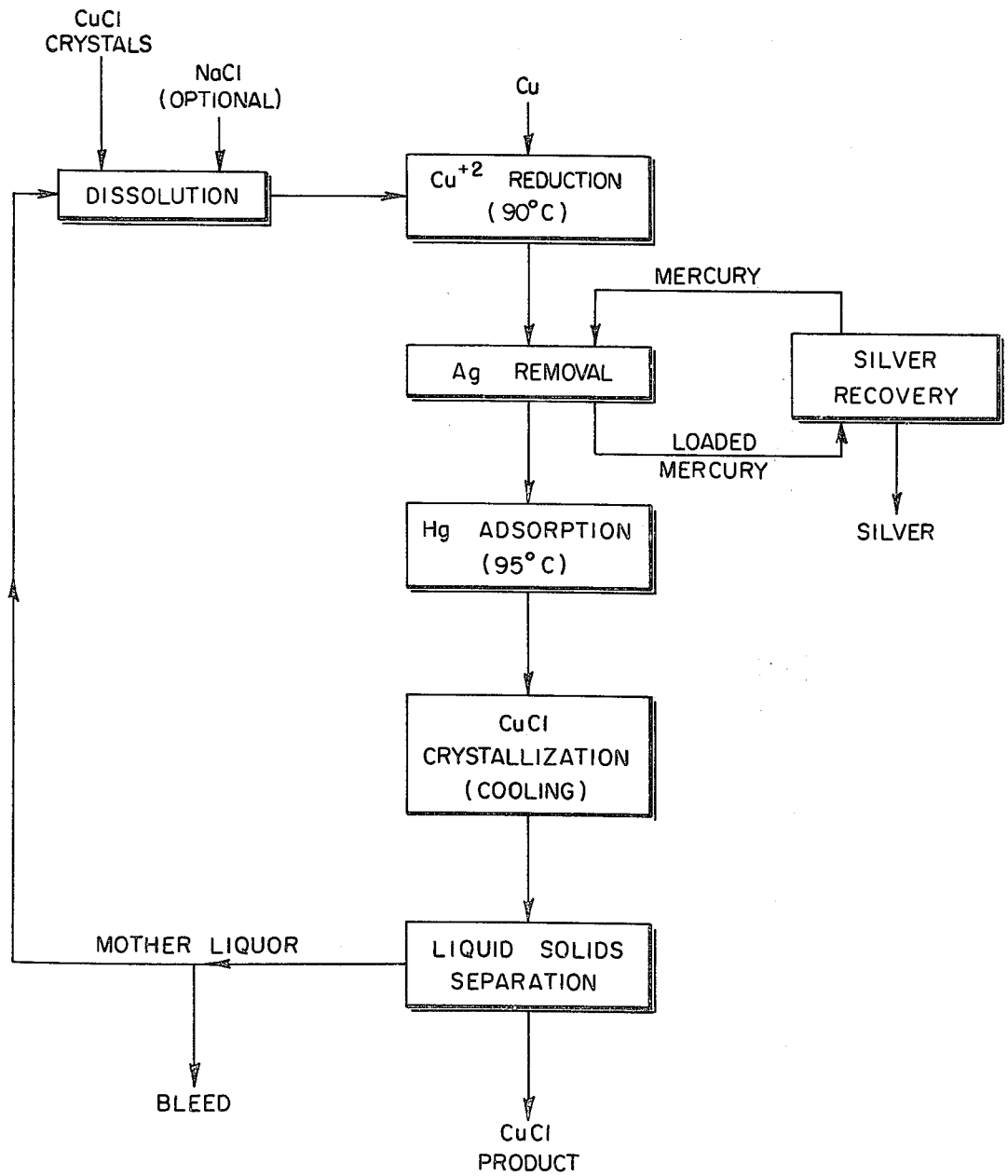
FIG. 1 is a flow diagram of the silver recovery process per se of the invention.

The invention will now be described with reference to the accompanying drawings. Referring specifically to FIG. 1 of the drawing, the feed material is shown as cuprous chloride crystals which is the crystallization product of the process illustrated in FIG. 2, that is, a process for recovering copper from a sulfide ore in which the copper is recovered as cuprous chloride crystals.

The cuprous chloride crystals are dissolved in a dissolution step to produce a cuprous chloride solution. The cuprous chloride solution is then contacted with copper to reduce any cupric copper to cuprous copper. A non-oxidizing atmosphere is maintained to prevent reoxidation of cuprous ion.

From the reduction step the cuprous chloride solution goes to the silver removal column where it is contacted with the amalgam to replace the metal in the amalgam with silver. The silver is then recovered in the silver recovery circuit by distilling the mercury.

Following the amalgamation step the cuprous chloride solution goes to a mercury absorption column for removal of any dissolved mercury and after this step the cuprous chloride solution goes to the recrystallizer where it is cooled to produce cuprous chloride crystals, and the crystals filtered to provide a product of cuprous chloride which is substantially free from silver. Part of the mother liquor from the cuprous chloride crystallization step is returned to the dissolution step and part of it is bled off to the main circuit of a copper process for recovering copper from its ore as illustrated in FIG. 2 for removal of some iron before its return to the ferric chloride leach.

The flowsheet of FIG. 2 depicts a prior art process for the recovery of copper from a copper sulfide ore in which the ore is leached with ferric chloride to provide a leach liquor, cuprous chloride crystallized from the leach liquor followed by a liquid solids separation to recover the cuprous chloride crystals which are reduced with hydrogen to provide the final copper product. In order to insure that this product is substantially free of silver, iron and other impurities, the silver recovery process of the invention is introduced before the cuprous chloride crystals are recovered by cooling, followed by recovery of copper from the cuprous chloride crystals.

To illustrate the operation of the invention, tests were made by dissolving the feed material, cuprous chloride, as shown in FIGS. 1 and 2, in sodium chloride solutions and removing the silver with various amalgams as shown in Table 1 below.

Table 1

Recovery of Ag from CuCl-NaCl Solutions
Free-flowing Amalgam

Feed solution: (Upflow)
CuCl = 100–185 g/l
NaCl = 200 g/l
$Ag^+$ = 0.03–0.05 g/l
Temperature = 75–85° C
Column:Dimensions: 1" ID × 9" long
Packing: Porcelain berl saddles, 6 mm (41% void vol)
Temperature: 75–85° C

| Test No. | Amalgam | Residence Time of Feed Solution in the Column, min | % Ag Removed |
|---|---|---|---|
| 1 | Cu, 3% | 9.3 | 89 |
| 2 | Cu, 3% | 13.1 | 94 |
| 3 | Fe, 3% | 13 | 83 |
| 4 | Fe, 3% | 14.4 | 75 |
| 5 | Fe, 3% | 14.9 | 94 |
| 6 | Fe, 3% | 4 | 89 |
| 7 | Fe, 0.5% | 15.8 | |
| 8 | Fe, 0.5% | 7.7 | |
| 9 | Zn, 0.5% | 15 | 82 |
| 10 | Zn, 0.5% | 13.7 | 91 |
| 11 | Zn, 0.5% | | 95 |

The data of Table 1 show that copper, iron or zinc amalgams effectively remove silver from sodium chloride solutions.

The rationale for utilizing the amalgams is as follows. Both zinc and iron metal are strong reductants and will completely cement $Cu^+$ as well as silver from a sodium chloride solution making them unsuitable as reductants. If, however, they are amalgamated with mercury metal and then utilized, little $Cu^+$ is cemented while silver is still rapidly and completely cemented.

Copper metal will not cement silver from this system in the presence of $Cu^+$. If the copper metal is amalgamated with mercury, this Cu-Hg amalgam will then cement silver from the solution but not $Cu^+$.

Copper is the most desirable amalgam as it is more compatable with the system and, therefore, additional tests were completed using copper amalgams and the data are shown in Tables 2, 3 and 4.

Two types of copper-Hg mixtures, which are referred to herein as amalgams were tested, a free-flowing copper ($\approx$0.1–0.5% Cu) amalgam and a high percent Cu ($\approx$90% Cu) amalgam which was essentially copper shot coated with mercury. It was found that contact of the feed solution with the amalgam can be effected batchwise, but is most conveniently accomplished in a column configuration. In one series of tests (Table 2) a low copper free-flowing amalgam was contacted with the hot CuCl-NaCl feed solution by flowing each counter-currently through a column packed with berl porcelain saddles.

In a second series of tests (Tables 3 and 4), essentially the same type of apparatus was used for the amalgamated copper shot, similar to an ion exchange column, and the feed solution upflowed through the shot. No mercury was pumped into the column.

Table 2
Recovery of Ag from CuCl-NaCl Solution Free-flowing Cu Amalgam

| Column: | Dimensions: | 15" long × 1.8" ID (0.022 ft³) |
|---|---|---|
| | Packing: | Porcelain berl saddles, 6 mm (60% void vol) |
| | Temperature: | 85–90° C |
| Amalgam: | | ≦0.5% Cu (downflow); flow rate = 23–35 ml./min. |
| Feed liquor: | | (Upflow); flowrate = 19–36 ml./min. CuCl = 169 g/l NaCl = 200–220 g/l Ag⁺ = 0.022–0.040 g/l Temperature = 80–90° C Free HCl = ≈ 2 g/l (pH = 0.0) |

| Test No. | Residence Time of Feed Solution in the Column (min) | Ag Concentration Feed/Effluent (g/l) | % Ag Removed |
|---|---|---|---|
| 1 | 16.0 | 0.028/0.005 | 82 |
| 2 | 19.0 | 0.040/0.005 | 88 |
| 3 | 10.0 | 0.040/0.006 | 85 |
| 4 | 17.5 | 0.022/<0.001 | >95 |

Table 3
Recovery of Ag from CuCl-NaCl Solutions - Amalgamated Cu-Shot Column

| Column: | Dimensions | 15" long × 1.8" ID |
|---|---|---|
| | Packing | Hg coated Cu Shot (3272 g; 9.8% Hg°). Void volume 37.2% |
| | Temperature | 85–90° C |
| Feed liquor: | | Given below |
| Temperature: | | 85–90° C |

| Test No. | Feed Liquor Residence Time, min | Ag g/l | CuCl g/l | Hg ppm | % Ag Removed |
|---|---|---|---|---|---|
| | 0-feed | 0.038 | 172.8 | 0.20 | — |
| 1 | 20.5 | <0.001 | 172.5 | 2.74 | >97 |
| 2 | 14.5 | <0.001 | 175.0 | 2.82 | >97 |
| 3 | 10.5 | 0.002 | 173.4 | 2.36 | 95 |
| 4 | 4.75 | <0.001 | 171.2 | | >95 |
| | 0-feed | 0.022 | — | — | — |
| 5 | 11.0 | 0.001 | 181 | 2.34 | 95 |
| | 0-feed | 0.026 | 177.2 | 0.11 | — |
| 6 | 12.0 | 0.010 | 181.9 | 1.38 | 62 |
| 7 | 6.9 | 0.010 | 182.2 | 1.75 | 62 |

Table 4
Recovery of Ag from CuCl-NaCl Solutions - Amalgamated Cu Shot Column

| Column: | Dimensions | 8.9" × 0.83" ID |
|---|---|---|
| | Packing | Hg-coated Cu shot (465 g; 6.6% Hg). Void volume = 38.5% |
| | Temperature | 85–90° C |
| Feed liquor: | | See below (upflow) |

| Test No. | Feed Liquor Residence Time, min | Ag g/l | CuCl g/l | Hg ppm | % Ag Removed |
|---|---|---|---|---|---|
| | 0-feed | 0.026 | 177.2 | 0.11 | — |
| 1 | 8 | 0.002 | — | — | 92 |
| 2 | 4.4 | 0.004 | 176.9 | 1.14 | 85 |
| 3 | 12.0 | 0.002 | 175.5 | 1.34 | 92 |
| | 0-feed | 0.176 | — | — | — |
| 4 | 8.8 | 0.012 | 172.2 | 1.90 | 93 |
| | 0-feed | 0.026 | 177.2 | 0.11 | — |
| 5 | 8.3 | 0.008 | 170.8 | 1.74 | 69 |

The data of Tables 2, 3 and 4 shows that effecient silver recoveries were achieved with both types of copper amalgams.

The free-flowing copper amalgam was prepared by shaking the pure mercury with 150-mesh copper powder under a pH 0.5 HCl solution; the copper entered the mercury phase within one half minute of hand shaking. The procedure for the preparation of the iron and zinc amalgams was similar.

The amalgamated copper shot was prepared by brightening the copper shot with 1M HCl at room temperature and then contacting the cleaned shot (1/16–¼ inch diameter) with mercury. Hand shaking the mixture under a pH 0.5 HCl solution produced a mercury-coated shot in less than two minutes. The shot was completely covered with a mercury layer.

The hot feed solution is passing through the silver removal column solubilizes some mercury from the amalgam. The removal of this solubilized mercury was accomplished by passing the hot feed solution through a heated column packed with copper metal. The effluent was then cooled to room temperature to produce cuprous chloride crystals.

The silver is recovered form the loaded free-flowing Cu amalgam by distillation of the mercury at approximately 280° C, 20 inches Hg vacuum. The residue from the mercury distillation is Cu-Ag dust. The percentage of Ag in this dust is dependent upon how high the mercury has been loaded in Ag and how low the Cu content has been allowed to drop.

Sometimes it is not necessary to distill all of the mercury if a copper amalgam is used. If the Ag-loaded amalgam still contains some Cu (>1.0%), a lighter Cu-Hg and Ag-Hg amalgam phase will float to the top of the unstirred amalgam. This top phase can be skimmed off and most of the silver present in the original amalgam recovered from it. The bottom Hg phase, low in copper and Ag, can be returned for recycle.

The following Table 5 presents results of skimming tests which were made following the above-outlined skimming procedure.

Table 5
Recovery of Ag from CuCl-NaCl Solutions Recovery of Ag from Loaded Hg° Skimming

| Test No. | Sample Description | Weight % | Assay Ag (%) | Assay Cu (%) | Distribution Ag (%) |
|---|---|---|---|---|---|
| 1 | Feed Hg | 100 | 0.37 | 2.2 | 100 |
| | Top Hg phase | 17.7 | 1.54 | 11.8 | 74.4 |
| | Bottom Hg phase | 82.3 | 0.07 | 0.19 | 25/6 |
| 2 | Feed Hg | 100 | 0.37 | — | 100 |
| | Top Hg phase | 20.7 | 1.50 | 12.6 | 82 |
| | Bottom Hg phase | 79.3 | 0.08 | 0.68 | 18 |
| 3 | Feed Hg | 100 | 0.38 | 1.0 | 100 |
| | Top Hg phase | 6.5 | 3.5 | — | 61 |
| | Bottom Hg phase | 93.5 | 0.15 | — | 39 |

The results presented in Table 5 show that 80% of the Ag can be skimmed off in the top phase which is 20.7% of the total weight of the feed amalgam. A 61% Ag recovery can be realized if only a 6.5 wt% fraction is skimmed off. The bottom phase which can be recycled contained 0.2–0.68% Cu and 0.07–0.15% Ag. The feed amalgam contained 1–2.2% Cu and 0.37% Ag. In order to apply the skimming technique, the feed amalgam must contain at least 1% Cu by weight or no Ag-Hg phase will float to the top of the amalgam.

Silver was recovered from the loaded amalgamated copper shot by elution with mercury. The loaded shot was placed in a glass column along with the Hg and some HCl solution (pH 0–1). The mixture was inverted periodically during the contact time. The free mercury was then drained from the column. Tests showed that 85–91% of silver can be removed from the loaded Cu shot (0.35 – 0.79% Ag) by contacting with free Hg. The Hg effluent contains 0.25 – 0.38% Ag and the stripped shot contained 0.05% Ag. This stripping procedure also re-amalgamates any Cu shot that may have become depleted in Hg and, therefore, rejuvenates the column for its next service cycle. A series of tests were made using the elution procedure and the results are presented in the following Table 6.

Table 6

Recovery of Ag from CuCl-NaCl Solutions
Recovery of Ag from Loaded Amalgamated Cu Shot Elution with Hg°

Procedure: Mix free-flowing Hg with the loaded amalgamated Cu shot and drain off free-flowing Hg°
Temperature: 25° C

| Test No. | Sample Description | Wt (g) | Ag (%) | Cu (%) | Hg (%) | Ag Recovery |
|---|---|---|---|---|---|---|
| 1 | Loaded Cu shot | 80 | 0.024 | 93.4 | ≈6.6 | |
| | Free Hg°, before elution | 229 | 0.002 | 0.34 | 99.66 | |
| | Free Hg°, effluent | — | 0.01 | 0.10 | 99.9 | ≈53% |
| | Stripped Cu shot | — | 0.010 | | | |
| 2 | Loaded Cu shot | 74 | 0.79 | 85.9 | 13.3 | |
| | Free Hg, before elution | 200 | 0.002 | — | 99.9 | |
| | Free Hg, effluent | 200 | 0.25 | — | 99.75 | ≈91% |
| | Stripped Cu shot | 69.5 | 0.051 | — | — | |
| 3 | Loaded Cu shot | 77 | 0.35 | 89.9 | 9.8 | |
| | Free Hg, before elution | 66 | 0.002 | | 99.9 | |
| | Free Hg, effluent | 61.5 | 0.38 | | | ≈85% |
| | Stripped Cu shot | 81 | 0.49 | | | |

It will be noted from the results that up to about 91% silver was recovered using the elution procedure.

A detailed incorporation of the above procedure as shown in FIG. 1 is presented below.

The CuCl crystals (150 ppm Ag, 200 ppm Fe) were dissolved in the Ag circuit mother liquor (≈200 g/l NaCl, ≈140 g/l CuCl, 0.001 g/l Ag$^+$, 0.0003 g/l Hg) at ≈90° C. After reduction of any soluble Cu$^{++}$ with metallic copper, this hot solution (200 g/l NaCl, 205 g/l CuCl, 0.011 g/l Ag$^+$, 90° C) was passed through the Ag removal column. The column effluent (200 g/l NaCl, 0.001 g/l Ag, ≈0.0025 g/l Hg) was passed through a column packed with Cu metal to reduce the soluble Hg level to 0.0004 g/l Hg before cooling to 35° C. The resulting CuCl crystals (65 g/l CuCl crop) contained <20 ppm Ag, ≈1.2 ppm Hg, and <20 ppm Fe. The mother liquor from crystallization was recycled. The Ag can be periodically recovered from the loaded Cu amalgam by the techniques described above.

A series of tests were conducted utilizing amalgams of other metals and the procedure outlined above. The results of these tests are reported in Table 7 below which also presents a comparative test using a copper amalgam.

Table 7

Recovery of Ag from CuCl-NaCl Solutions
Investigation of Various Amalgams

Temperature: 25° C
Feed solution: 0.055 g/l Ag, 176 g/l CuCl, 300 g/l NaCl, 0.9–3.7 g/l Fe$^{+2}$, pH = 0.0, 100 ml.
Amalgam: 60 g Procedure: Mix amalgam and solution batchwise

| Test No. | Feed Amalgam Metal | % | Reaction Time (hr) | % Removed From Solution Ag | Cu |
|---|---|---|---|---|---|
| 1 | Bi | 0.64 | 2.5 | 98 | 3 |
| 2 | Pb | 1.6 | 2.5 | >98 | — |
| 3 | Cd | 3.1 | 2.5 | >98 | 13.1 |
| 4 | Ni | 0.38 | | >98 | — |
| | Zn | 0.46 | 2.5 | >98 | — |
| 5 | Zn | 0.5 | 0.5 | >95 | — |
| 6 | Fe | 0.5 | 0.5 | >95 | — |
| 7 | Cu | 0.1 | 2.5 | 98 | — |

The results show that up to 98% of silver is removed from the cuprous chloride-sodium chloride solution and that the bismuth, lead, cadmium, nickel, zinc and iron amalgams are as effective as the copper amalgam for silver removal. These other amalgams were prepared by a method similar to that used for preparing the copper amalgam as described above.

Additional tests were completed (Table 8), illustrating the applicability of the invention to the removal of silver from ferrous containing leach liquors.

Table 8

| Test No. | Amalgam Description Metal | g Metal g Hg | Feed Solution Fe$^{+2}$ (g/l) | Cu$^{+1}$ (g/l) | Ag (g/l) | Product Filtrate Fe$^{+2}$ (g/l) | Cu$^{+1}$ (g/l) | Ag (g/l) | Zn (g/l) | Hg (g/l) | Reaction Time (hr) | Ag Removal % |
|---|---|---|---|---|---|---|---|---|---|---|---|---|
| 1 | Hg coated Zn | 5 g/l. coating | 166 | 67 | 0.034 | 50.7 | 0.008 | 3.4 | 0.02 | 1 | 76 | |
| 2 | Zn | 5 g/l. coating | 126 | 70 | 0.34 | 126.8 | 69 | 0.018 | 1.04 | 0.002 | 1 | 95 |
| 3 | Zn | 5 g/l. coating | 143 | 60 | 0.24 | 141 | 56 | 0.05 | 1.70 | 0.024 | 4 | 79 |
| 4 | Hg only | — | | 77 | 0.56 | | 77 | 0.50 | | 0.006 | 18 | 11 |
| 5 | Zn-Hg | 0.3/13.8 | 155 | 78 | 0.032 | 154 | 76 | 0.015 | 1.68 | 0.0034 | 2 | 53 |
| 6 | Zn-Hg | 1.8/14 | 155 | 78 | 0.032 | 162 | 76 | 0.022 | 0.6 | 0.006 | 2 | 31 |
| 7 | Zn-Hg | 1.4/14 | 164 | 103 | 0.050 | 172 | 84 | 0.014 | | 0.002 | 4 | 72 |
| 8 | Zn-Hg | 1.91/191 | 167 | 89 | 0.044 | — | 84 | <0.001 | 5.3 | 0.01 | 0.5 | 100 |
| 9 | Hg coated Cu | 5 g/coating | — | 77 | 0.56 | — | 80 | 0.34 | — | 0.128 | 18 | 39 |
| 10 | Fe-Hg | 1.9/190 | 167 | 89 | 0.044 | 177 | 73 | <0.001 | | 0.003 | 1.0 | 100 |

[Note: Cu$^{+2}$ = 0$_2$ g/l in all tests]

The solution contained ferrous, ferric, cuprous and cupric ions along with silver. The types of amalgams employed were Zn-Hg, Hg pool, Cu-Hg and Fe-Hg. All tests were run at 65°–75° C with feed liquors which contained 126–176 g/l Fe$^{++}$ at a pH of 0.5. Various weight ratios of zinc to mercury amalgams were used and, in addition, various ratios of processed liquor to amalgams were tried.

The results show that Zn, Cu and Fe amalgams effectively remove silver from these leach liquors. Mercury alone was ineffective in removing silver.

It is seen from the above description and results that a process has been provided for the effective recovery of silver from cuprous chloride solutions. The process is seen to be particularly effective for use in combination with processes for the recovery of copper from its sulfide ores in which the copper is solubilized as the cuprous ion and recovered by cuprous chloride crystallization. The process results in a successful recovery of substantially all of the valuable silver in the ore with a consequent result that a salable copper product is produced which is substantially free from silver.

What is claimed is:

1. A process for recovering silver from a cuprous chloride solution which comprises:
   (a) contacting the solution with a mercury amalgam of a metal selected from the group consisting of metals of groups 4a, 5a, 2b, and 8 of the periodic table and copper to replace said metal in the amalgam with silver, and
   (b) recovering the silver by separating it from the formed silver amalgam.

2. The process of claim 1 in which the metal is a member selected from the group consisting of lead, bismuth, copper, zinc, cadmium, iron and nickel.

3. The process of claim 2 in which the metal is copper.

4. The process of claim 2 in which the metal is iron.

5. The process of claim 2 in which the metal is zinc.

6. The process of claim 2 in which the metal is bismuth.

7. The process of claim 2 in which the metal is lead.

8. The process of claim 2 in which the metal is cadmium.

9. The process of claim 2 in which the metal is nickel.

10. The process of claim 2 in which any cupric ions in the solution are reduced to cuprous ions prior to contact of the solution with the amalgam.

11. The process of claim 2 in which the silver is recovered from the silver amalgam by distilling the mercury.

12. The process of claim 2 in which the cuprous chloride is maintained in solution by the addition of sodium chloride or ferrous chloride to the solution prior to contacting the solution with the amalgam.

13. In the process for the recovery of copper from its ores in which the copper in a leach solution is reduced to the cuprous form and recovered as cuprous chloride by crystallization, the improvement for recovering silver from the leach solution which comprises:
    (a) contacting the cuprous chloride solution prior to crystallization with a mercury amalgam of a metal selected from the group consisting of groups 4a, 5a, 2b, and 8 of the periodic table and copper to replace said metal or alloy in the amalgam with silver;
    (b) recovering the silver by separating it from the formed silver amalgam; and
    (c) recovering copper from the crystallized cuprous chloride.

14. The process of claim 13 in which said metal is a member selected from metals of the group consisting of lead, bismuth, copper, zinc, cadmium, iron and nickel.

15. The process of claim 13 in which the ore is a sulfide ore.

16. The process of claim 15 in which the ore is chalcopyrite.

17. A process for recovering silver from a silver chloride solution which comprises:
    (a) contacting the solution with a mercury coated substrate of a metal selected from the group consisting of metals of groups 4a, 5a, 2b and 8 of the periodic table and copper which absorbs the silver from solution on the substrate;
    (b) contacting the mercury coated substrate loaded in silver with pure free-flowing mercury to remove the silver from the substrate so that it dissolves in the free-flowing mercury and therby regenerate the mercury coated substrate, and
    (c) recovering silver from the mercury.

18. The process of claim 17 in which is selected from the group consisting of lead, bismuth, copper, zinc, cadmium, iron and nickel.

19. The process of claim 18 in which the metal is copper.

20. A process for recovering silver from a cuprous chloride solution which comprises:
    (a) contacting the solution with a copper - mercury amalgam for a period to replace not more than 99 percent by weight copper in the amalgam so that the lighter Cu-Hg and Ag-Hg amalgam phase floats on the Cu-Hg amalgam;
    (b) skimming off the floating top phase, and
    (c) recovering silver from said skimming product.

21. The process of claim 20 in which the bottom phase of Cu-Hg amalgam is recycled to step (a).

* * * * *

UNITED STATES PATENT AND TRADEMARK OFFICE
CERTIFICATE OF CORRECTION

PATENT NO. : 4,124,379
DATED : November 7, 1978
INVENTOR(S) : Mark A. Peters, William G. Kazel It is certified that error appears in the above-identified patent and that said Letters Patent are hereby corrected as shown below:

Amend Table 8, the line corresponding to Test 1, by leaving the space under Product Filtrate, $Fe^{+2}$ blank, and moving the data thereunder one column to the right, and thus moving all subsequent data one column to the right, as follows:

| | | Product Filtrate | | | | |
|---|---|---|---|---|---|---|
| $Fe^{+2}$ (g/l) | $Cu^{+1}$ (g/l) | Ag (g/l) | Zn (g/l) | Hg (g/l) | Reaction Time (hr) | Ag Removal % |
| | 50.7 | 0.008 | 3.4 | 0.02 | 1 | 76 |

Signed and Sealed this

Tenth Day of April 1979

[SEAL]

Attest:

RUTH C. MASON
Attesting Officer

DONALD W. BANNER
Commissioner of Patents and Trademarks